United States Patent
Comins et al.

(10) Patent No.: US 8,937,410 B2
(45) Date of Patent: Jan. 20, 2015

(54) EMERGENCY STOP METHOD AND SYSTEM FOR AUTONOMOUS MOBILE ROBOTS

(75) Inventors: Todd Comins, Chelmsford, MA (US);
Larry Gray, Merrimack, NH (US);
Joseph L. Jones, Acton, MA (US);
Clara Vu, Cambridge, MA (US);
Charles M. Grinnell, Arlington, MA (US)

(73) Assignee: Harvest Automation, Inc., Billerica, MA (US)

( * ) Notice: Subject to any disclaimer, the term of this patent is extended or adjusted under 35 U.S.C. 154(b) by 522 days.

(21) Appl. No.: 13/351,743

(22) Filed: Jan. 17, 2012

(65) Prior Publication Data

US 2013/0181544 A1 Jul. 18, 2013

(51) Int. Cl.
*H02H 11/00* (2006.01)

(52) U.S. Cl.
USPC .......................................................... 307/326

(58) Field of Classification Search
USPC .......................................................... 307/326
See application file for complete search history.

(56) References Cited

U.S. PATENT DOCUMENTS

| | | | |
|---|---|---|---|
| 3,821,504 A * | 6/1974 | Schomaker et al. | 200/52 R |
| 3,913,758 A | 10/1975 | Faircloth et al. | |
| 4,155,198 A | 5/1979 | Kelley | |
| 4,217,073 A | 8/1980 | Propst | |
| 4,401,236 A | 8/1983 | Germaine | |
| 4,476,651 A | 10/1984 | Drury | |
| 4,522,546 A | 6/1985 | Ringer | |
| 4,700,301 A | 10/1987 | Dyke | |
| 4,749,327 A | 6/1988 | Roda | |
| 4,793,096 A | 12/1988 | Todd, Sr. | |
| 4,854,802 A | 8/1989 | deGroot | |
| 4,869,637 A | 9/1989 | deGroot | |
| 4,994,970 A | 2/1991 | Noji et al. | |
| 5,016,541 A | 5/1991 | Feaster, Jr. | |
| 5,020,964 A | 6/1991 | Hyatt et al. | |
| 5,020,965 A | 6/1991 | Tanaka et al. | |
| 5,046,914 A | 9/1991 | Holland et al. | |
| 5,051,906 A | 9/1991 | Evans, Jr. et al. | |
| 5,081,941 A | 1/1992 | Weeks | |
| 5,085,553 A | 2/1992 | Bouwens et al. | |
| 5,160,235 A | 11/1992 | Bikow | |

(Continued)

FOREIGN PATENT DOCUMENTS

| | | | |
|---|---|---|---|
| DE | 3828447 A1 | 3/1990 | |
| EP | 0195191 A1 | 9/1986 | |

(Continued)

OTHER PUBLICATIONS

International Search Report and Written Opinion for PCT/US2012/067939, dated Mar. 26, 2013.

(Continued)

*Primary Examiner* — Robert L. Deberadinis
(74) *Attorney, Agent, or Firm* — Rajesh Vallabh; Foley Hoag LLP

(57) ABSTRACT

An emergency stop system for an autonomous mobile robot includes a base unit connected to the robot and an element engageable by a user extending from the base unit. The element is movably held by the base unit in an operation mode position. The base unit includes a mechanism for detecting the presence of the element in the operation mode position and triggering an emergency stop of the robot when the element is moved out of the operation mode position by the user.

25 Claims, 5 Drawing Sheets

(56) References Cited

U.S. PATENT DOCUMENTS

| | | |
|---|---|---|
| 5,181,818 A | 1/1993 | Tanaka et al. |
| 5,211,523 A | 5/1993 | Andrada Galan et al. |
| 5,315,517 A | 5/1994 | Kawase et al. |
| 5,332,363 A | 7/1994 | Tanaka et al. |
| 5,348,063 A | 9/1994 | Handleman |
| 5,348,361 A | 9/1994 | Ilchuk |
| 5,403,142 A | 4/1995 | Stewart |
| 5,427,492 A | 6/1995 | Tanaka et al. |
| 5,496,143 A | 3/1996 | Breyer |
| 5,688,102 A | 11/1997 | Vieselmeyer |
| 5,769,589 A | 6/1998 | Lubbers |
| 5,819,863 A | 10/1998 | Zollinger et al. |
| 5,842,306 A | 12/1998 | Onosaka et al. |
| 5,959,423 A | 9/1999 | Nakanishi et al. |
| 5,974,348 A | 10/1999 | Rocks |
| 5,988,971 A | 11/1999 | Fossey et al. |
| 6,164,537 A | 12/2000 | Mariani et al. |
| 6,186,730 B1 | 2/2001 | Place |
| 6,212,821 B1 | 4/2001 | Adam et al. |
| 6,216,631 B1 | 4/2001 | Wissner-Gross |
| 6,243,987 B1 | 6/2001 | Hessel |
| 6,255,793 B1 | 7/2001 | Peless et al. |
| 6,336,051 B1 | 1/2002 | Pangels et al. |
| 6,347,920 B1 | 2/2002 | Place |
| 6,389,329 B1 | 5/2002 | Colens |
| 6,417,641 B2 | 7/2002 | Peless et al. |
| 6,431,818 B1 | 8/2002 | Place |
| 6,481,948 B2 | 11/2002 | Spears |
| 6,496,755 B2 | 12/2002 | Wallach et al. |
| 6,508,033 B2 | 1/2003 | Hessel et al. |
| 6,532,404 B2 | 3/2003 | Colens |
| 6,543,983 B1 | 4/2003 | Felder et al. |
| 6,611,738 B2 | 8/2003 | Ruffner |
| 6,638,004 B2 | 10/2003 | Berger et al. |
| 6,658,324 B2 | 12/2003 | Bancroft et al. |
| 6,667,592 B2 | 12/2003 | Jacobs et al. |
| 6,729,836 B2 | 5/2004 | Stingel, III et al. |
| 6,850,024 B2 | 2/2005 | Peless et al. |
| 6,854,209 B2 | 2/2005 | Van Horssen et al. |
| 6,857,493 B2 | 2/2005 | Shupp et al. |
| 6,915,607 B2 | 7/2005 | Tagawa et al. |
| 6,950,722 B2 | 9/2005 | Mountz |
| 6,984,952 B2 | 1/2006 | Peless et al. |
| 6,988,518 B2 | 1/2006 | Rackers |
| 6,997,663 B2 | 2/2006 | Siebenga |
| 7,069,111 B2 | 6/2006 | Glenn et al. |
| 7,086,820 B1 | 8/2006 | Blake |
| 7,137,770 B2 | 11/2006 | Ueda |
| 7,184,855 B2 | 2/2007 | Stingel, III et al. |
| 7,198,312 B2 | 4/2007 | Blaho |
| 7,200,465 B2 | 4/2007 | Stingel, III et al. |
| 7,261,511 B2 | 8/2007 | Felder et al. |
| 7,274,167 B2 | 9/2007 | Kim |
| 7,343,222 B2 | 3/2008 | Solomon |
| 7,400,108 B2 | 7/2008 | Minor et al. |
| 7,506,472 B2 | 3/2009 | Leyns et al. |
| 7,559,736 B1 | 7/2009 | Mohan |
| 7,579,803 B2 | 8/2009 | Jones et al. |
| 7,610,122 B2 | 10/2009 | Anderson |
| 7,613,544 B2 | 11/2009 | Park et al. |
| 2001/0008112 A1 | 7/2001 | Opitz |
| 2002/0120364 A1 | 8/2002 | Colens |
| 2002/0146306 A1 | 10/2002 | Morrell |
| 2002/0182046 A1 | 12/2002 | Schempf et al. |
| 2003/0030398 A1 | 2/2003 | Jacobs et al. |
| 2003/0118487 A1 | 6/2003 | Pressman et al. |
| 2003/0165373 A1 | 9/2003 | Felder et al. |
| 2003/0199944 A1 | 10/2003 | Chapin et al. |
| 2004/0139692 A1 | 7/2004 | Jacobsen et al. |
| 2005/0090961 A1 | 4/2005 | Bonk et al. |
| 2005/0126144 A1 | 6/2005 | Koselka et al. |
| 2005/0135912 A1 | 6/2005 | Schempf et al. |
| 2005/0135913 A1 | 6/2005 | Visser |
| 2005/0238465 A1 | 10/2005 | Razumov |
| 2005/0246056 A1 | 11/2005 | Marks et al. |
| 2005/0254924 A1 | 11/2005 | Swetman et al. |
| 2005/0254927 A1 | 11/2005 | Swetman et al. |
| 2005/0268987 A1 | 12/2005 | Rackers |
| 2006/0045679 A1 | 3/2006 | Ostendorff |
| 2006/0072988 A1 | 4/2006 | Hariki et al. |
| 2006/0095169 A1 | 5/2006 | Minor et al. |
| 2006/0120834 A1 | 6/2006 | Pressman et al. |
| 2006/0213167 A1 | 9/2006 | Koselka et al. |
| 2006/0221769 A1 | 10/2006 | Van Loenen et al. |
| 2006/0257236 A1 | 11/2006 | Stingel et al. |
| 2006/0293810 A1 | 12/2006 | Nakamoto |
| 2007/0017181 A1 | 1/2007 | Jacobsen et al. |
| 2007/0042803 A1 | 2/2007 | Anderson |
| 2007/0129849 A1 | 6/2007 | Zini et al. |
| 2007/0140821 A1 | 6/2007 | Garon et al. |
| 2007/0152619 A1 | 7/2007 | Sugiyama et al. |
| 2007/0219720 A1 | 9/2007 | Trepagnier et al. |
| 2008/0046130 A1 | 2/2008 | Faivre et al. |
| 2008/0131254 A1 | 6/2008 | Cope et al. |
| 2008/0279663 A1 | 11/2008 | Alexander |
| 2009/0012667 A1 | 1/2009 | Matsumoto et al. |
| 2009/0021351 A1 | 1/2009 | Beniyama et al. |
| 2009/0054222 A1 | 2/2009 | Zhang et al. |
| 2009/0148034 A1 | 6/2009 | Higaki et al. |
| 2009/0175709 A1 | 7/2009 | Okabe et al. |
| 2009/0214324 A1 | 8/2009 | Grinnell et al. |
| 2009/0254217 A1 | 10/2009 | Pack et al. |
| 2011/0025454 A1 | 2/2011 | Pomerantz et al. |
| 2012/0114187 A1 | 5/2012 | Duarte |
| 2013/0325159 A1 | 12/2013 | Kilibarda et al. |

FOREIGN PATENT DOCUMENTS

| | | |
|---|---|---|
| EP | 0774702 A2 | 5/1997 |
| JP | S61204714 A | 9/1986 |
| JP | 03-285602 A | 12/1991 |
| JP | 07-065908 | 3/1995 |
| JP | 11-077579 | 3/1999 |
| JP | 2006-346767 A | 12/2006 |
| JP | 2007-508667 A | 4/2007 |
| JP | 2009-511288 A | 3/2009 |
| WO | 94/22094 A1 | 9/1994 |
| WO | 99/59042 A1 | 11/1999 |
| WO | 2007/004551 A1 | 1/2007 |
| WO | 2009/024246 A1 | 2/2009 |

OTHER PUBLICATIONS

SICK LMS 200 Technical Description, Jun. 2003 [online] [retrieved Sep. 11, 2014]. Retrieved from: http://www.sick-automation.ru/images/File/pdf/LMS%20Technicai%20Description.pdf.

* cited by examiner

US 8,937,410 B2

EMERGENCY STOP METHOD AND SYSTEM FOR AUTONOMOUS MOBILE ROBOTS

BACKGROUND

The present application relates generally to autonomous mobile robots and, more particularly, to an emergency stop system for such robots.

BRIEF SUMMARY OF THE DISCLOSURE

In accordance with one or more embodiments, an emergency stop system is provided for an autonomous mobile robot. The system includes a base unit connected to the robot and an element engageable by a user extending from the base unit. The element is movably held by the base unit in an operation mode position. The base unit includes a mechanism for detecting the presence of the element in the operation mode position and triggering an emergency stop of the robot when the element is moved out of the operation mode position by the user.

In accordance with one or more further embodiments, a method of causing an autonomous mobile robot to stop operating is provided. The robot includes a base unit and an element engageable by a user extending from the base unit. The element is movably held by the base unit in an operation mode position. The base unit includes a mechanism for detecting the presence of the element in the operation mode position and triggering an emergency stop of the robot when the element is moved by the user out of the operation mode position. The method comprises engaging the element to move it out of the operation mode position to trigger an emergency stop.

In accordance with one or more further embodiments, a method of causing an autonomous mobile robot to stop operating is provided. The robot includes a base unit and an element engageable by a user extending from the base unit. The element is movably held by the base unit in an operation mode position. The method includes the steps of: detecting movement of the element from the operation mode position; and triggering an emergency stop of the robot when the element is moved by the user out of the operation mode position.

BRIEF DESCRIPTION OF THE DRAWINGS

Like or identical reference numbers are used to identify common or similar elements.

DETAILED DESCRIPTION

Autonomous mobile robots are used in a variety of industries, including in the agricultural industry. For example, one particular use of autonomous robots is for performing automated potted plant processing operations. Specifically, robots can be used to identify, pick up, transport, and deposit container-holding plants as disclosed in co-pending U.S. patent application Ser. No. 12/378,612 filed on Feb. 18, 2009 and entitled ADAPTABLE CONTAINER HANDLING SYSTEM and U.S. patent application Ser. No. 13/100,763 filed on May 4, 2011 and entitled ADAPTABLE CONTAINER HANDLING ROBOT WITH BOUNDARY SENSING SUBSYSTEM.

As a safety feature, autonomous mobile robots can include an emergency stop system to instantly stop operation of a robot if, e.g., the robot malfunctions or otherwise operates in a way that creates a potentially hazardous condition. An emergency stop feature can be implemented as a latched push button. When this button is pressed by a human user, power is removed from any robot systems (e.g., motors used to drive the robot wheels or other mechanisms). Once the stop button has been pressed, the button must be physically reset before the robot can resume normal operation.

This type of emergency stop system works well for fixed equipment. However, using a push button stop feature may be problematic for computer-controlled, mobile equipment. A software fault or other fault can produce an arbitrary response in such equipment. For example, if a certain sort of fault occurs on a differential-drive mobile robot, the robot could enter a state where one drive wheel is halted while the other turns at maximum velocity. This and other conditions can make it difficult for a user to reach the stop button without being struck by the robot.

Various embodiments disclosed herein are directed to an emergency stop system for autonomous mobile robots that can be quickly and easily actuated by users. The emergency stop system can be implemented in virtually any type of autonomous mobile robots, including robots used in the agricultural industry.

Figure 1:
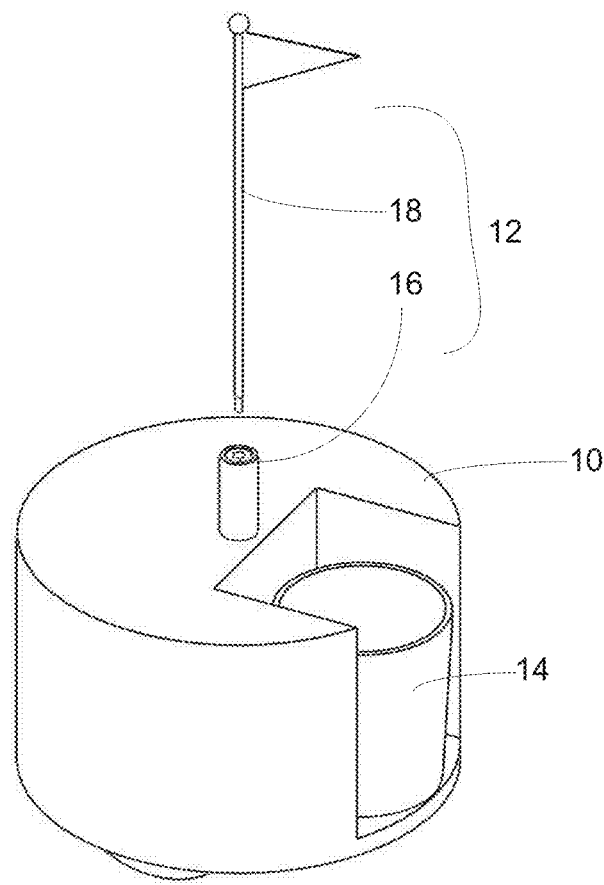
FIG. 1 is a simplified perspective view of an exemplary autonomous mobile robot having an emergency stop system in accordance with one or more embodiments.

FIG. 1 illustrates an exemplary autonomous mobile robot 10 having an emergency stop system 12 in accordance with one or more embodiments. In this example, the robot 10 is configured to transport a container-grown plant 14. The emergency stop system 12 includes a base unit 16 connected to the robot 10 and a flag or other element 18 engageable by a human user extending from and held by the base unit 16. During normal robot operation, the flag 18 rests in a receptacle 30 (shown in FIG. 2) in the base unit 16 in an operation mode position. However, if the robot 10 malfunctions or otherwise needs to be stopped quickly, the human user simply grabs and pulls the flag 18 or knocks it out of the operation mode position in the base unit 16. A sensor mechanism 28 (shown in FIG. 3) in the base unit 16 detects movement of the flag 18 from the operation mode position and responsively triggers an emergency stop of the robot 10. It is considerably easier and safer for a user to grasp or knock down the flag 18 than to locate and press a button on the robot 10.

Figure 2:
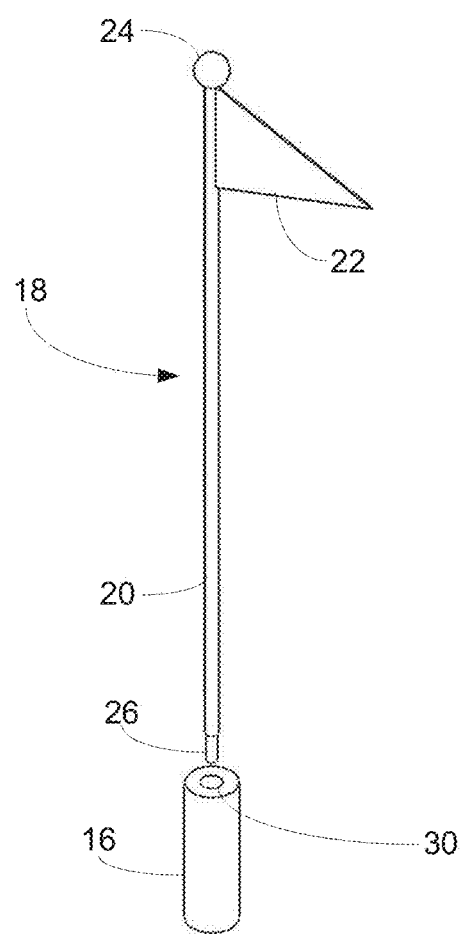
FIG. 2 is a simplified perspective view of an exemplary emergency stop system in accordance with one or more embodiments.

As shown in FIG. 2, the flag 18 includes a mast 20 and a pennant 22, which allows motion of the robot 10 to be easily observed from a distance. Autonomous mobile robots are typically supervised by a human worker who may oversee a number of robots operating on different fields. As the robots carry out their duties, their motion will cause the pennant 22 to sway back and forth. This motion makes it easy for the human worker to determine from a distance whether and how each robot is working.

The flag 18 further includes a knob 24 to eliminate the sharp point at the top of the mast 20 to prevent injury to users.

A variety of different sensor mechanisms 28 can be used in the base unit 16 to detect the presence of the flag 18 in the operating mode position. By way of example, the tip of the flag 18 held by the base unit 16 includes a magnet 26 at the lower tip of the mast 20 (as shown in FIG. 2), and mechanism 28 includes a Hall-effect sensor for detecting the presence of the magnet 26.

Alternately, the sensor mechanism 28 can include an optical break beam sensor for detecting the presence of the flag 18 in the operation mode position.

The sensor mechanism 28 may also comprise an electrical circuit, in which the tip of the flag 18 acts as a switch in the circuit such that movement of the flag 18 from the operation mode position breaks a connection in the circuit.

Figure 3:
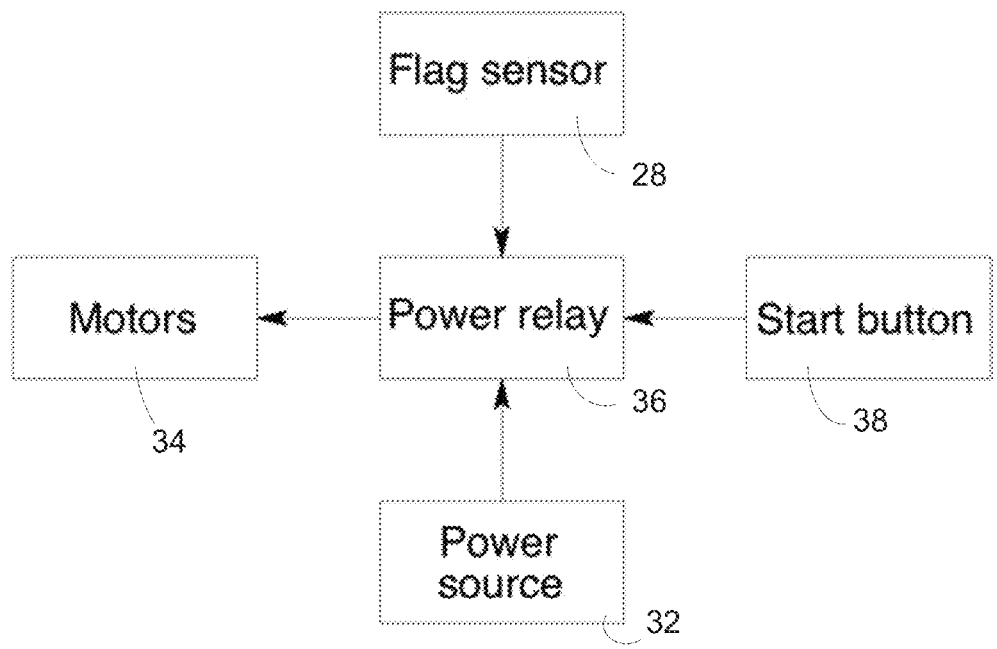
FIG. 3 is a block diagram illustrating connectivity of an exemplary emergency stop system in a robot in accordance with one or more embodiments.

FIG. 3 is a block diagram illustrating connectivity of the emergency stop system 12 in a robot 10. The robot 10 includes a power source (e.g., a battery system) 32 that supplies power to one or more motors 34 through a power relay 36. The base unit sensor mechanism 28 and the start button 38 are connected to and transmit control signals to the relay 36. The power relay 36 is preferably implemented in solid-state electronics. Alternatively, the power relay can comprise a mechanical device.

Figure 4:
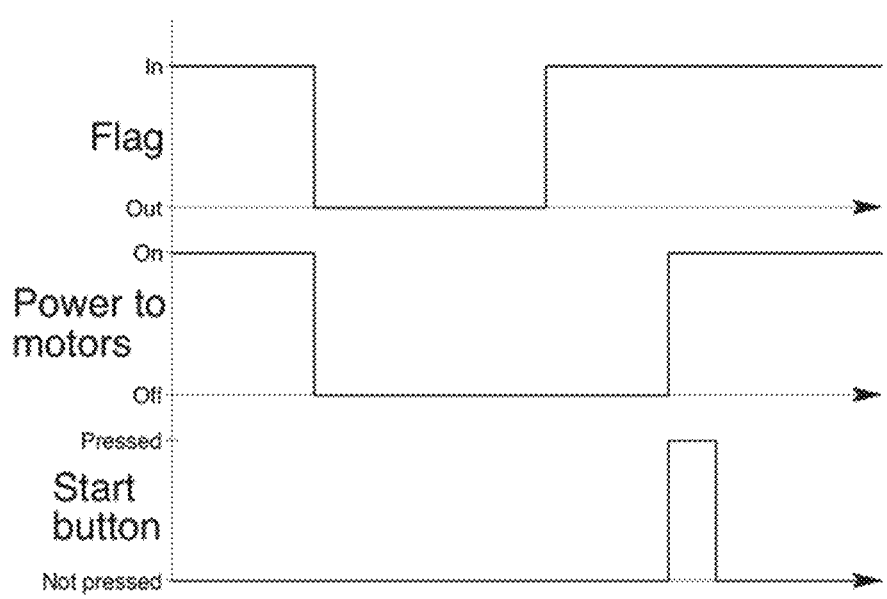
FIG. 4 is an exemplary system logic chart illustrating operation of an exemplary emergency stop system in accordance with one or more embodiments.

FIG. 4 illustrates exemplary emergency stop system logic in accordance with one or more embodiments. If the flag 18 is removed from the base unit 16 during normal operation of the robot 10, power to the robot motors is interrupted. Power cannot be restored until (1) the flag 18 is first returned to the base unit 16 and (2) the start button 38 is then pressed.

In accordance with one or more embodiments, the exemplary stop system functionality is implemented generally entirely in hardware.

Figure 5:
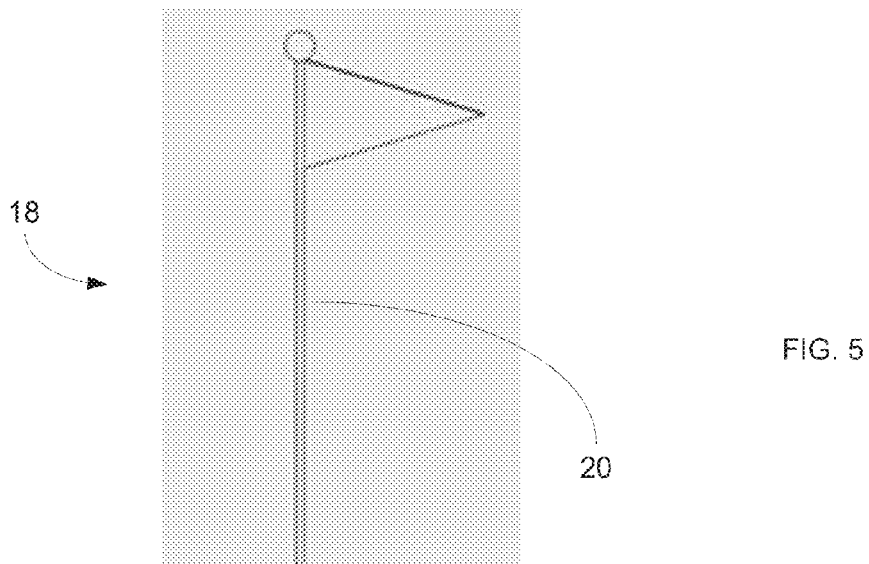
FIG. 5 illustrates an alternative exemplary emergency stop system in accordance with one or more embodiments.

The flag 18 should be easily removable from the base unit 16 by a user. In accordance with one or more embodiments, if the flag mast is rigid, the receptacle 30 of the base unit 16 is configured to provide compliance to make it easy for a user to remove the flag 18. Without compliance in the base unit 16, the flag mast may bind if the pull-direction (i.e., the direction the flag is pulled by a user) is not vertical. As shown in FIG. 5, compliance can be provided by attaching the base unit receptacle 30 to a spring 42. If the flag 18 is pulled a direction other than completely vertical, the receptacle will become oriented in the direction of the sideward force, allowing the flag 18 to be removed easily.

Figure 6:
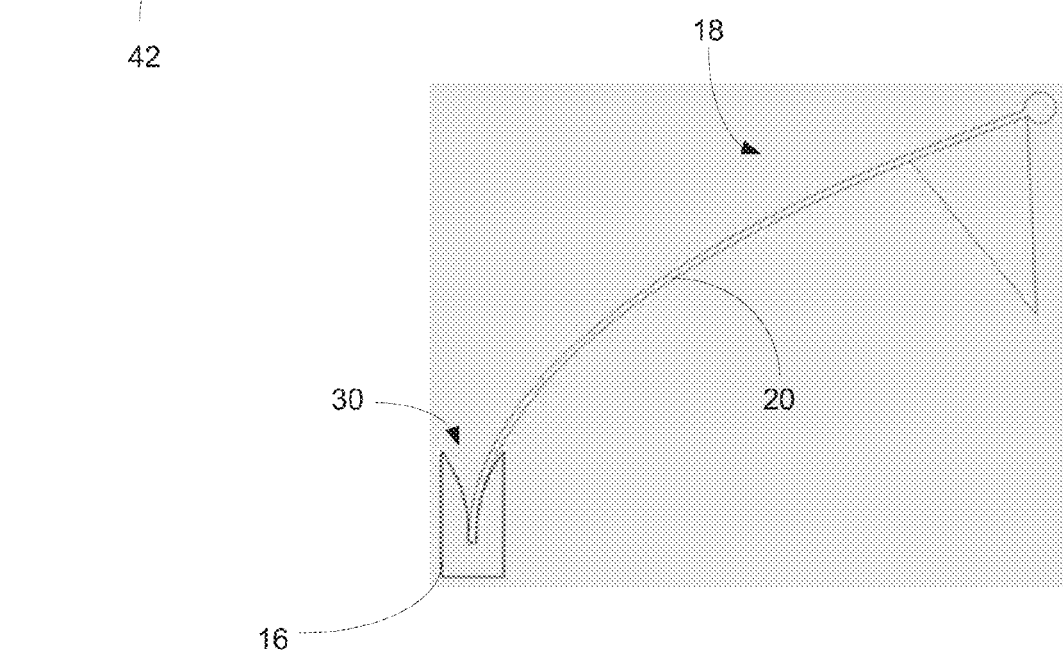
FIG. 6 illustrates an alternative exemplary emergency stop system in accordance with one or more embodiments.

Alternately, in accordance with one or more further embodiments, if the flag mast is compliant, rather than rigid, the base unit receptacle 30 can be configured to have a radiused cross-section as shown in FIG. 6. The radiused cross-section geometry transforms sideward-pull forces into axial forces to facilitate easy removal of the flag 18.

Figure 7:
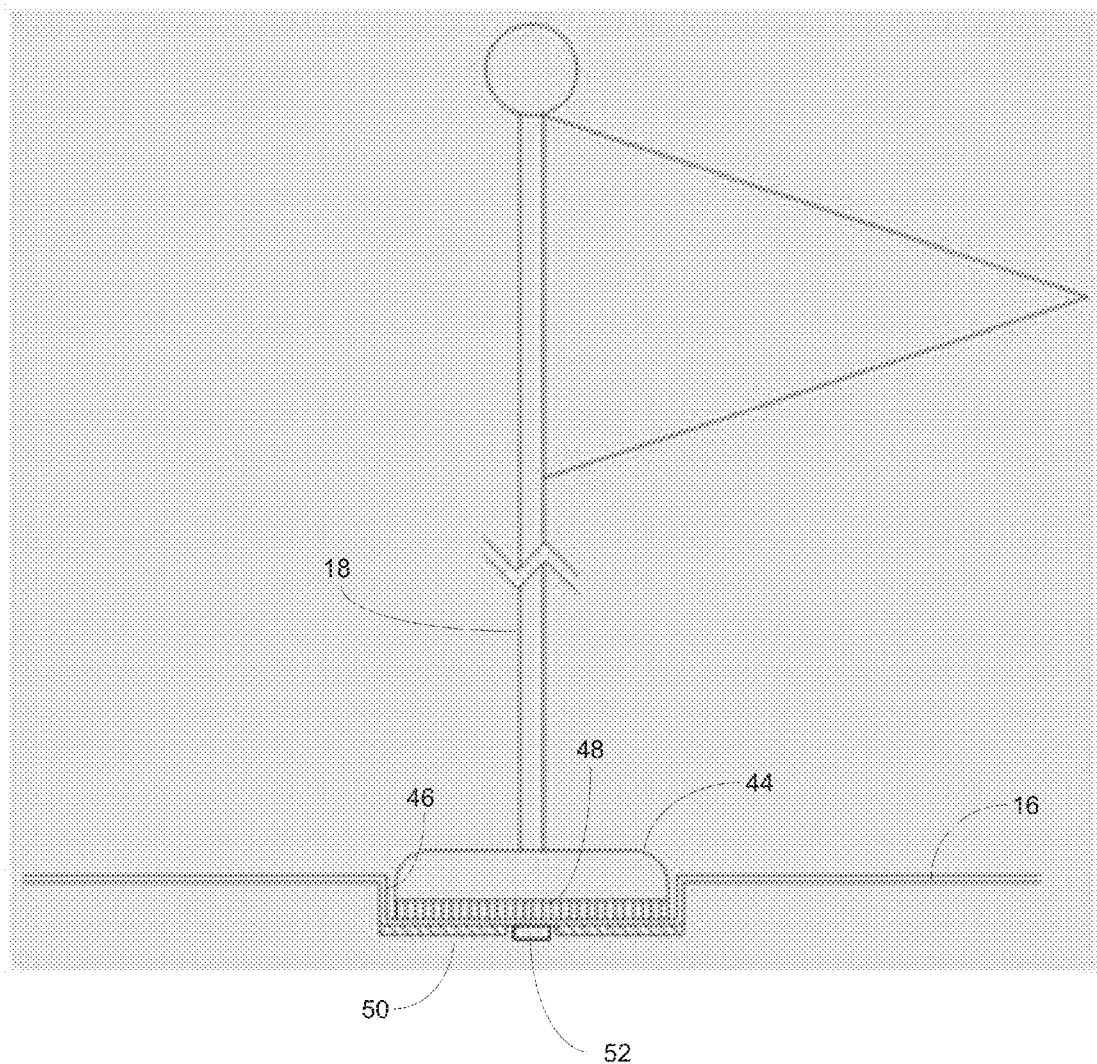
FIG. 7 illustrates an alternative exemplary emergency stop system in accordance with one or more embodiments.

In a further alternate embodiment, easy flag removal can be accomplished using a flag mast having a broad flat flag base 44 as shown in FIG. 7. The flag base 44 is retained in a recessed area 46 in the base unit 16 that is shallow and allows easy removal of the flag. The recessed area 46 in the base unit 16 is sized to receive the flag base 44. The flag base 44 includes a magnet 48. A layer of ferrous material 50, to which the magnet 48 in the flag base 44 is attracted, is provided at the bottom of the recessed area 46. A Hall-effect or other magnetic field sensor 52 is provided under the recessed area 46. In this position, the sensor 52 can determine when the flag 18 is present.

Having thus described several illustrative embodiments, it is to be appreciated that various alterations, modifications, and improvements will readily occur to those skilled in the art. Such alterations, modifications, and improvements are intended to form a part of this disclosure, and are intended to be within the spirit and scope of this disclosure. While some examples presented herein involve specific combinations of functions or structural elements, it should be understood that those functions and elements may be combined in other ways according to the present disclosure to accomplish the same or different objectives. In particular, acts, elements, and features discussed in connection with one embodiment are not intended to be excluded from similar or other roles in other embodiments. Additionally, elements and components described herein may be further divided into additional components or joined together to form fewer components for performing the same functions.

Accordingly, the foregoing description and attached drawings are by way of example only, and are not intended to be limiting.

What is claimed is:

1. A computer-controlled autonomous mobile robot, comprising:
    a chassis;
    a drive subsystem for maneuvering the chassis including one or more motors;
    a power source;
    a power relay for relaying power from the power source to the one or more motors; and
    an emergency stop system to trigger an emergency stop of the autonomous mobile robot by causing the power relay to interrupt power flow to the one or more motors, said emergency stop system comprising:
    a base unit connected to the robot; and
    an element engageable by a user extending from the base unit, the element being movably held by the base unit in an operation mode position,
    wherein the base unit includes a mechanism for detecting the presence of the element in the operation mode position and triggering an emergency stop of the robot when the element is moved out of the operation mode position by the user.

2. The computer-controlled autonomous mobile robot of claim 1, wherein the element comprises an elongated member extending from a portion of the robot.

3. The computer-controlled autonomous mobile robot of claim 2, further comprising a pennant at an end of the elongated member distal to the base unit.

4. The computer-controlled autonomous mobile robot of claim 2, further comprising a rounded knob at an end of the elongated member distal to the base unit.

5. The computer-controlled autonomous mobile robot of claim 1, wherein the element includes a magnet in a portion thereof held by the base unit, and wherein the mechanism includes a Hall-effect sensor for detecting the presence of the element in the operation mode position.

6. The computer-controlled autonomous mobile robot of claim 1, wherein the mechanism comprises an optical break beam sensor for detecting the presence of the element in the operation mode position.

7. The computer-controlled autonomous mobile robot of claim 1, wherein the mechanism includes an electrical circuit, and the element includes electrical contacts comprising a portion of the circuit such that movement of the element from the operation mode position breaks a connection in the circuit to trigger an emergency stop.

8. The computer-controlled autonomous mobile robot of claim 1, wherein the mechanism includes a mechanical switch, and movement of the element from the operation mode position activates the mechanical switch.

9. The computer-controlled autonomous mobile robot of claim 1, wherein the robot further comprises a start switch engageable by a user to continue robot operation once an element moved out of the operation mode position has been returned to the operation mode position.

10. The computer-controlled autonomous mobile robot of claim 1, wherein a portion of the base unit holding the element is compliant to facilitate easy removal of the element from the base unit by the user.

11. The computer-controlled autonomous mobile robot of claim 10, wherein the portion of the base unit comprises a spring.

12. The computer-controlled autonomous mobile robot of claim 1, wherein the portion of the base unit holding the element includes a radiused opening to facilitate easy removal of the element from the base unit by the user.

13. The computer-controlled autonomous mobile robot of claim 1, wherein the element includes a generally flat base, and wherein the base unit includes a shallow recessed area for holding the generally flat base to facilitate easy removal of the element from the base unit by the user.

14. A method of supervising operation of a plurality of computer-controlled mobile robots autonomously performing operations in a given area, each of the robots including an emergency stop system comprising a base unit and an element engageable by a user extending from the base unit, the element being movably held by the base unit in an operation mode position, wherein the base unit includes a mechanism for detecting the presence of the element in the operation mode position and triggering an emergency stop of the robot when the element is moved by the user out of the operation mode position, the method comprising:
   observing the operation of the plurality of robots from a remote location;
   identifying a malfunctioning robot among said plurality of robots;
   approaching said malfunctioning robot from said remote location; and
   engaging the element of the emergency stop system of said malfunctioning robot to move it out of the operation mode position to trigger an emergency stop of the malfunctioning robot.

15. The method of claim 14, wherein engaging the element comprises grasping the element and pulling it out of the base.

16. The method of claim 14, wherein engaging the element comprises knocking the element out of the operation mode position.

17. The method of claim 14, further comprising returning the element to the operation mode position and activating a start switch to restart the robot.

18. The method of claim 14, wherein the element comprises an elongated member extending from a portion of the robot.

19. The method of claim 18, wherein the elongated member includes a pennant at an end thereof distal to the robot.

20. A method performed by an autonomous mobile robot, the robot including an emergency stop system comprising a base unit and an element engageable by a user extending from the base unit, the element being movably held by the base unit in an operation mode position, the method comprising the steps of:
   autonomously performing a given operation in a given area;
   detecting movement of the element from the operation mode position when the element is moved by the user; and
   triggering an emergency stop of the robot when movement of the element out of the operation mode position is detected.

21. The method of claim 20, wherein triggering an emergency stop of the robot comprises causing a power relay to interrupt power flow to the one or more motors of the robot.

22. The method of claim 20, wherein the element includes a magnet in a portion thereof held by the base unit, and wherein detecting movement of the element from the operation mode position comprises using a Hall-effect sensor for detecting the presence of the element in the operation mode position.

23. The method of claim 20, wherein detecting movement of the element from the operation mode position comprises using an optical break beam sensor for detecting the presence of the element in the operation mode position.

24. The method of claim 20, wherein the mechanism includes an electrical circuit, and the element includes electrical contacts comprising a portion of the circuit such that movement of the element from the operation mode position breaks a connection in the circuit to trigger an emergency stop.

25. The method of claim 20, wherein the mechanism includes a mechanical switch, and movement of the element from the operation mode position activates the mechanical switch.

* * * * *